July 21, 1942.  H. F. MEHAFFIE  2,290,760
VOLTAGE TESTER
Filed May 13, 1940
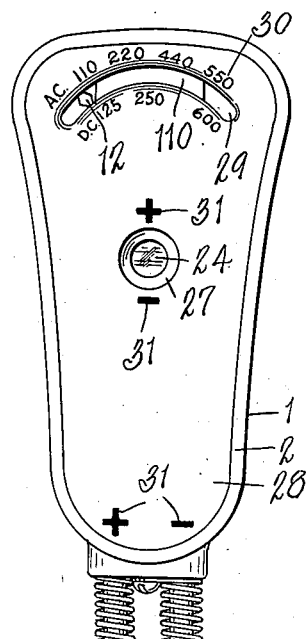
Fig. 1.
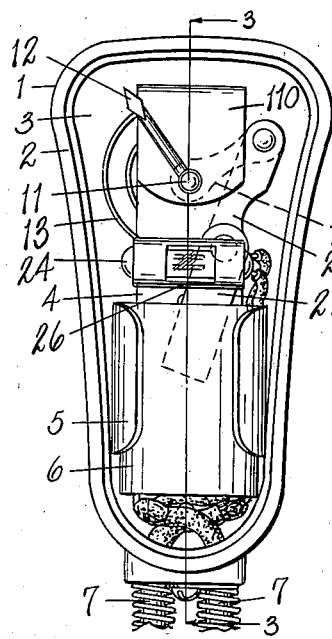
Fig. 2.
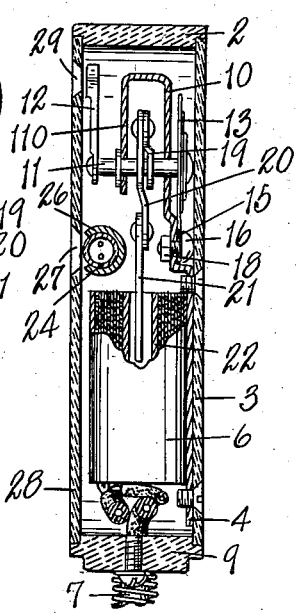
Fig. 3.
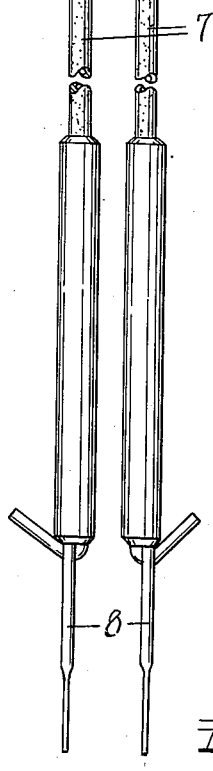
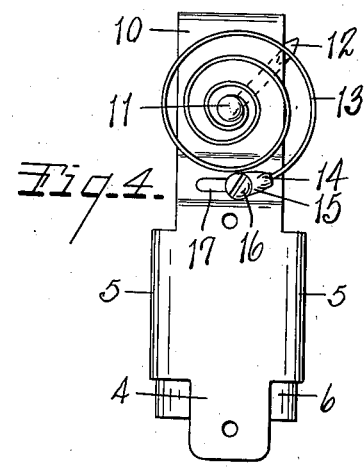
Fig. 4.
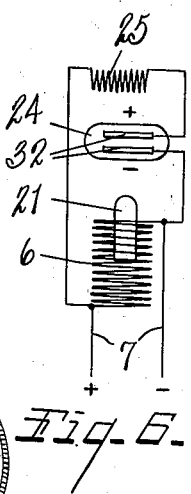
Fig. 6.
Fig. 5.
INVENTOR.
HUGH F. MEHAFFIE
BY Earl & Chappell
ATTORNEYS Patented July 21, 1942

2,290,760

UNITED STATES PATENT OFFICE 2,290,760

VOLTAGE TESTER

Hugh F. Mehaffie, Kalamazoo, Mich.

Application May 13, 1940, Serial No. 334,786

4 Claims. (Cl. 171—95)

This invention relates to improvements in voltage testers.

The main objects of my invention are:

First, to provide an improved voltage testing device for hand use which is exceedingly compact and convenient and which measures voltages as to amount and polarity thereof, either A. C. or D. C. with accuracy.

Second, to provide a device of the type described having novel adjustment means for initially calibrating the same.

Third, to provide a device of the type described capable of affording quantitative information relative to a voltage tested as well as the polarity thereof at the point tested, and whether it is A. C. or D. C.

Fourth, to provide a device of the type described including a solenoid coil energized to actuate an indicator in one direction and spring means for actuating the indicator in the other direction with means for readily adjusting the tension of the spring means in order to calibrate the device.

Fifth, to provide a device of the type described which has few moving parts and is simple, compact and rugged.

Further objects relating to details and economies of my invention will appear from the description to follow. The invention is defined in the claims.

A structure embodying the features of my invention is illustrated in the accompanying drawing, wherein:

Fig. 1 is a view in front elevation illustrating a testing device or instrument in accordance with my invention.

Fig. 2 is a fragmentary elevational view of the device with the front cover plate removed, illustrating the arrangement of the elements of the device.

Fig. 3 is a fragmentary view in section on line 3—3 of Fig. 2, further illustrating details of construction.

Fig. 4 is a rear elevational view of the electrical unit illustrating means for readily calibrating the tester.

Fig. 5 is an enlarged fragmentary view in transverse horizontal section through the solenoid coil and spool therefor, illustrating the generally rectangular outline of the winding of the former and the elongated rectangular construction of the latter.

Fig. 6 is a conventionalized wiring diagram for the electrical elements of the device.

Generally speaking, the present invention relates to a highly compact hand instrument for measuring electrical voltages, which is primarily characterized by its inclusion of means whereby the drop in potential may be measured over any two points in an electrical circuit without disconnecting the latter and whereby further information is furnished as to the character of the potential and the polarity thereof at any point. More specifically, the device incorporates novel means for adjusting a spring return element theheof to regulate the same in calibrating and furthermore in its inclusion of a solenoid of particular construction which greatly improves the operation of the device as a whole.

In the drawing, the reference numeral 1 indicates the testing device of my invention which consists of a case 2 of a size and outline enabling the same to be conveniently grasped in the hand. This case has interiorly secured to the rear wall 3 thereof a bracket 4 having U-shaped arms 5 for holding a solenoid coil 6. The coil has the opposite ends thereof connected to testing leads 7 which are provided with suitable testing prongs 8, the leads being led out through a suitable bottom closure element 9 for the case.

Bracket 4 has an upwardly extending yoke-shaped member 10, the arms 110 of which afford a mounting for a rotatable spindle or shaft 11 extending on opposite sides of the U portion 10. On one side thereof an indicating finger or pointer 12 is secured to the shaft and on the other side a spiral return spring 13 is secured to the shaft at its center and to the bracket at its free end 14.

My invention includes novel means for adjusting the torsion exerted by spring 13 (see Fig. 4), in the form of a flat tab 15 secured to the free spring end 14 and receiving a bolt 16. This bolt extends through an elongated aperture or slot 17 in bracket 4 and threadedly receives a nut 18 for locking the free end 14 of the spring in any desired position relative to the slot. The tension exerted by the spring may thereby be regulated in calibrating the device. It will be understood that inasmuch as considerable uniformity is achieved in the production of these springs only slight discrepancies in the torque will exist, which the regulating means aforesaid is effective to compensate for.

Intermediate the indicating finger and the spring 13 on shaft 11 and preferably between the two arms of the inverted U 10 of the bracket, I connect a radial arm 19 to the shaft, which arm is in turn connected by a loosely pivoted link 20 to the armature 21 of the solenoid whereby when the armature is drawn downwardly by energization of coil 6, shaft 11 will be rotated in opposition to spring 13, the rotating torque applied to the shaft being of course proportional to the voltage impressed on the leads 8 and traversing coil 6.

Referring to Figs. 2, 3, and 5, it wil be noted that the armature 21 is in the form of a flat iron element and that the spool or core 22 upon which the coil 6 is wound is of elongated rectangular cross section. I find this elongated rectangular construction for the spool or core and armature advantageous for the reason that the armature centers itself more readily in its vertical and swinging movement (see Fig. 2) and is, all in all, more stable in action than in the case of a cylindrical spool and armature.

The coil 6 is preferably a "layer" wound coil. The coil is preferably tested to stand over 5000 volts without failure.

I desire to point out that in associating the flat rectangular armature to the indicator pointer actuating member by means of a loose pivotal connection and by providing a solenoid coil having an opening of elongated rectangular section to receive the armature with substantial lateral play at the sides thereof, the tester is freed from an objection which has hitherto characterized all solenoid type hand testing devices with which I am familiar. This resides in the fact that the armature invariably flutters or vibrates in the solenoid coil when alternating or intermittent voltages are being tested, in particular with high potential voltages of this character. In some instances, the resultant vibration and hum are so pronounced as to be disconcerting and, moreover, the indicating finger is subject to a similar vibration or fluttering which makes an accurate reading virtually impossible and practically necessitates the use of interpolation in order to ascertain an approximate reading.

However, in the case of an armature of relatively flat, rectangular section, loosely pivoted to the indicator actuating linkage and receivable in a rectangular solenoid spool of similar outline, all this is eliminated. In the rectangular spool, the flux density is greatest at the sides thereof so as to be effective on the armature to draw the same transversely of the coil. The loose pivotal connection mentioned enables the armature to drop slightly to one side when the instrument is picked up in the user's hands, thereby enabling the armature to be magnetically attracted toward one of the sides of the coil, since the magnetic attraction varies inversely with the distance between the armature and the side of the coil. As a result, the armature is maintained against one of the sides of the solenoid spool and fluttering and instability are effectively damped. Hum is eliminated, and the present structure is the only one of which I am aware in solenoid type hand testers of the present description which is free from hum. This is accomplished without objectionably increasing the frictional resistance to operation as occurs in instances where an attempt is made to guide the armature closely in a solenoid core. The indicator finger 12 assumes the position exactly indicating the voltage involved and maintains this position without fluttering or vibration. I regard fluttering, vibration and hum elimination as being a factor of primary importance in the present invention.

Referring to Fig. 6, I provide in parallel with the coil 6 an auxiliary electrical indicating circuit including a small two-element neon or other gaseous filled tube 24 in series with a relatively high resistance 25. The tube 24 is supported in the case by an appropriate fixture 26 (see Figs. 2 and 3), and the elements thereof are adapted to be viewed through a circular aperture 27 formed in the face plate 2 of the device. Likewise, a suitable segmental viewing opening 29 is provided adjacent the pointer 12 whereby the latter may be perceived when it is rotated by the solenoid. The last named viewing opening 29 is suitably calibrated in terms of A. C. or D. C., as generally indicated by the reference numeral 30. The face plate 28 has polarity indications 31 adjacent the tube viewing opening as well as adjacent the point of connection of leads 7 to the case for a purpose to be described.

The tube 24 is preferably a miniature bulb filled with an appropriate gas, namely, neon, and having two elements 32 which characteristically glow when enclosed in such a hermetically sealed and gas filled tube and subjected to a potential. Furthermore, only one thereof glows when direct current is applied thereto, whereas both elements glow when alternating current is applied, due to the reversal of polarity of the voltage. Thus, with the arrangement illustrated, should it be found that the upper element 32 of tube 24 glows when the prongs 8 are electrically connected in an energized circuit, it follows that a D. C. voltage is present whose value is indicated by finger 12 on the D. C. scale. Should, however, the lower element only glow, then it is known that a D. C. voltage is involved, but that the instrument is reversed as to polarity, whereupon the prongs 8 will be reversed and the appropriate reading taken by reference to pointer 12. Should both A. C. elements glow, then the A. C. voltage can be taken directly from the appropriate scale adjacent viewing opening 29.

The resistance 25, series connected with the tube 24, prevents destruction of the latter in the event excessive voltage is applied to the instrument.

The foregoing device is one which is exceedingly simple and rugged. It can be made and manufactured for substantially less than the cost of the average manual testing device of similar nature. It affords all the information desired with reference to the voltage of the circuit in question, namely, amount, polarity and A. C.—D. C., by the extremely simple provisions which I have described. The assembly and calibration are conveniently and quickly effected and the readings are surprisingly accurate.

I have illustrated and described my improvements in an embodiment which is very practical. I have not attempted to illustrate and describe other embodiments or adaptations as it is believed this disclosure will enable those skilled in the art to embody or adapt my improvements as may be desired.

Having thus described my invention, what I claim as new and desire to secure by Letters Patent is:

1. A tester of the type described comprising a solenoid coil having a spool of substantially flat elongated rectangular section about which the wire of the coil is wound, an armature telescopingly reciprocable in said spool and of corresponding relatively flat cross sectional outline, said armature being shiftable laterally of said spool for magnetic stabilizing engagement with a flat side thereof under the increased magnetic force adjacent said side when the coil is energized, a rotatable shaft having an indicating finger thereon, an arm on the shaft, and a link pivotally connecting said arm to the armature for rotation of the shaft by the solenoid.

2. A tester of the type described comprising a casing, an indicating finger pivotally mounted on said casing and coacting with voltage indicia thereon, an actuating linkage for said finger, and means connected to said linkage for operating the same to actuate said finger relative to said indicia, comprising a solenoid provided with an armature of flat, generally rectangular section having a loose pivotal connection to said linkage, said solenoid having a center spool of similar relatively flat, generally rectangular outline receiving said armature with clearance at the sides of the latter and with the flat armature sides substantially parallel to the flat spool sides, and test leads connected to the ends of the solenoid coil, said coil when energized providing a substantially increased magnetic force at the flat elongated sides thereon effective to draw said armature toward and against one of the sides of said spool and maintain the same in non-fluttering engagement thereagainst during energization of the coil, said loose pivotal connection of the armature to the linkage enabling said lateral shifting of the armature.

3. A tester of the type described comprising a casing, an indicating finger movably mounted on said casing and coacting with voltage indicia thereon, actuating means for said finger, and means connected to said actuating means for operating the same to actuate said finger relative to said indicia, comprising a solenoid provided with an armature of relatively flat, generally rectangular section having a loose pivotal connection to said actuating means, said solenoid being of relatively flat, generally rectangular hollow section and receiving said armature with the flat sides thereof substantially parallel to the flat solenoid sides, and test leads connected to said solenoid, said solenoid when energized providing a substantially increased magnetic force at the flat side thereon effective to draw said armature toward and against one of the sides of said solenoid and maintain the same in non-fluttering engagement thereagainst during energization, said loose pivotal connection of the armature to the actuating means enabling said lateral shifting of the armature.

4. A voltage testing device comprising a support having an indicator movably mounted thereon, actuating means for said indicator comprising a solenoid on said support having the coil thereof wound in a relatively flat, generally rectangular hollow section, an armature of relatively flat, generally rectangular section reciprocable therein, and connecting means between the indicator and armature effecting a relatively loose operating connection to said indicator to actuate the latter, said connection permitting lateral movement of the armature, said armature being receivable interiorly of said solenoid with the flat sides of the armature and solenoid substantially parallel and with clearance therebetween whereby the greater magnetic force of the flat side of the solenoid when the latter is energized draws said armature laterally toward the same for stabilized, non-fluttering engagement thereagainst, said loose connection enabling the aforesaid lateral shifting of the armature.

HUGH F. MEHAFFIE.